(12) United States Patent
Bennett

(10) Patent No.: US 11,848,985 B2
(45) Date of Patent: Dec. 19, 2023

(54) MASS ELECTRONIC MAIL SENDING SYSTEM WITH FLEXIBLE PUBLIC SENDING NETWORK ADDRESSES

(71) Applicant: Salesforce, Inc., San Francisco, CA (US)

(72) Inventor: Patrick Morrison Bennett, Carmel, IN (US)

(73) Assignee: Salesforce, Inc., San Francisco, CA (US)

( * ) Notice: Subject to any disclaimer, the term of this patent is extended or adjusted under 35 U.S.C. 154(b) by 178 days.

(21) Appl. No.: 17/163,058

(22) Filed: Jan. 29, 2021

(65) Prior Publication Data
US 2022/0247810 A1    Aug. 4, 2022

(51) Int. Cl.
*H04L 67/1001* (2022.01)
*H04L 61/2521* (2022.01)
(Continued)

(52) U.S. Cl.
CPC ...... *H04L 67/1001* (2022.05); *G06F 9/45558* (2013.01); *H04L 61/2528* (2013.01);
(Continued)

(58) Field of Classification Search
CPC . H04L 67/1001; H04L 61/5007; H04L 67/56; H04L 61/2528; H04L 2101/37;
(Continued)

(56) References Cited

U.S. PATENT DOCUMENTS 7,730,478 B2   6/2010   Weissman
8,458,264 B1 *  6/2013   Lee ...................... G06Q 10/107
                                                         709/206
(Continued)

OTHER PUBLICATIONS

Tarreau, "The Proxy protocol," versions 1 & 2, Mar. 5, 2020, 17 pages, downloaded from http://www.haproxy.org/download/1.8/doc/proxy-protocol.txt on Jan. 28, 2021.
(Continued)

*Primary Examiner* — Mohamed A. Wasel
*Assistant Examiner* — John Fan
(74) *Attorney, Agent, or Firm* — Nicholson, De Vos, Webster & Elliott, LLP

(57) ABSTRACT

A method by an email sending system to send emails from different public sending network addresses. The method includes receiving, by a load balancer, an email that is to be sent by the email sending system, sending, by the load balancer, the email to a mail transfer agent (MTA) instance from a plurality of MTA instances, wherein each of the MTA instances has access to configuration data that indicates which proxy virtual machines (VMs) serve as egresses for which public sending network addresses, determining, by the MTA instance, a public sending network address to send the email from, determining, by the MTA instance based on consulting the configuration data, a proxy VM that serves as an egress for the public sending network address, and sending, by the MTA instance, the email to the proxy VM for sending to its destination from the public sending network address.

20 Claims, 9 Drawing Sheets

(51) Int. Cl.
*G06F 9/455* (2018.01)
*H04L 61/5007* (2022.01)
*H04L 67/56* (2022.01)
*H04L 101/37* (2022.01)

(52) U.S. Cl.
CPC .......... *H04L 61/5007* (2022.05); *H04L 67/56* (2022.05); *G06F 2009/4557* (2013.01); *G06F 2009/45595* (2013.01); *H04L 2101/37* (2022.05)

(58) Field of Classification Search
CPC ......... G06F 9/45558; G06F 2009/4557; G06F 2009/45595
USPC ........................................................ 709/206
See application file for complete search history.

(56) References Cited

U.S. PATENT DOCUMENTS

| | | | |
|---|---|---|---|
| 2012/0207174 A1* | 8/2012 | Shieh ................... | H04W 28/20 370/401 |
| 2013/0238715 A1* | 9/2013 | Sanyal ................... | H01L 51/00 709/206 |
| 2018/0219819 A1* | 8/2018 | O'Brien ............. | G06Q 30/0277 |
| 2019/0104063 A1* | 4/2019 | Cidon ................ | H04L 12/2854 |
| 2021/0226951 A1* | 7/2021 | Goldstein ............. | H04L 63/104 |

OTHER PUBLICATIONS

"VirtualMTA Technology in PowerMTA," SparkPost, Sep. 2019, 6 pages, downloaded from https://www.sparkpost.com/wp-content/uploads/2019/09/PMTA-Email-Infrastructure-VirtualMTA_2019.pdf on Jan. 28, 2021.

* cited by examiner

MASS ELECTRONIC MAIL SENDING SYSTEM WITH FLEXIBLE PUBLIC SENDING NETWORK ADDRESSES

TECHNICAL FIELD

One or more implementations relate to the technical field of mass electronic mail (email) sending systems, and more specifically to a mass email sending system that can send emails from different public sending network addresses.

BACKGROUND

An electronic mail (email) sending system may send massive quantities of email (e.g., sometimes billions per day) to contacts on behalf of its users (e.g., customers of the email sending service provided by the email sending system). Mass email sends are susceptible to being classified as spam by other mail servers. Thus, it is important for an email sending system to take measures to improve the credibility of the emails it sends and to prevent a user of the email system from adversely affecting the reputation of other users. Well-known mail servers with a history of sending legitimate emails are less likely to have their emails blocked or filtered by other mail servers.

The Internet Protocol (IP) address of the mail server sending an email is often used to determine the email sender's reputation (the IP address of the mail server is effectively used as the email sender's identity). Thus, it is important for an email sending system to be able to have control over which IP addresses emails are sent from (i.e., which IP addresses are used as the source IP address when sending emails). An email sending system typically has a pool of public sending IP addresses it can use to send emails from. The email sending system may partition this pool of public sending IP addresses among its users to ensure that emails sent by one user do not affect the reputation of other users. The email sending system may have the ability to add new public sending IP addresses to the pool of public sending IP addresses, while slowly ramping up emails that are sent from those new public sending IP addresses to slowly build up IP address reputation (i.e., perform IP "warming").

An email sending system may have a "general send" pool of public sending IP addresses that is shared among multiple users having relatively low volumes of email sends. For users with higher volumes of email sends, the email sending system may assign a dedicated pool of public sending IP addresses to each of those users (and these public sending IP addresses may be registered with public domain name service (DNS) to be associated with the user's domain name). The email sending system may send emails for the high-volume users from the public sending IP addresses assigned to the respective users. The email sending system may even allow users to specify which public sending IP addresses to send emails from on a per-email basis. This may be useful in situations where a user wants to prevent certain types of emails from negatively affecting the delivery of other types of emails. For example, a user may wish to send its marketing emails and transactional emails (ID verification, password reset, etc.) from different public sending IP addresses so that the marketing emails (which are more likely to be flagged as spam) do not negatively affect the delivery of the transactional emails (which are more important to be delivered).

Existing email sending systems allocate a dedicated pool of mail transfer agents (MTA) instances to each user (at least for the high-volume users). With this configuration, each user is allocated enough MTA instances to handle the peak email sending load of that user. This means that the dedicated pools of MTA instances are sized on a per-user basis. It has been observed that a user will usually only have a few batches of email sends per day that each last for just a fraction of the day (e.g., 30 minutes) and the rest of the time their pool of MTA instances remain idle. Also, it is highly unlikely that all users of the email sending system will use the full capacity of their dedicated pools of MTA instances at the same time. Thus, sizing the dedicated pools of MTA instances on a per-user basis to handle the peak email sending load of each user results in the over-provisioning of resources (e.g., computing and storage resources needed for the dedicated pools of MTA instances). Also, having a dedicated pool of MTA instances for each user puts a limit on each user's email sending capacity (e.g., the email sending capacity of a user is limited by the number of MTA instances allocated to the user).

Also, with existing email sending systems, each MTA instance in the dedicated pool of MTA instances allocated to a user needs to have as many private IP addresses as there are public sending IP addresses assigned to the user. For example, as shown in FIG. 9, assuming 60 MTA instances are needed to handle a user's email sends and the user is assigned 6 public sending IP addresses, the email sending system will need to have at least 360 private IP addresses (60 MTA instances multiplied by 6 public sending IP addresses) to support email sends just for this user and these private IP addresses are statically mapped to one of the user's public sending IP addresses so that source network address translation (SNAT) can be performed at egress. An email sending system may contain many such dedicated pools of MTA instances for multiple users so the number of private IP addresses needed to support email sends can become very large and exceed the capacity of even the largest network switches in the email sending system (e.g., Address Resolution Protocol (ARP) tables can become very large as it has to keep track of a large number of private IP addresses).

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for flexibly sending emails from different public sending network addresses. According to some implementations, an email sending system includes a pool of mail transfer agent (MTA) instances that is shared among users of the email sending system. Also, the email sending system includes multiple proxy virtual machines (VMs), where each of the proxy VMs serve as an egress for a set of public sending network addresses. Each of the MTA instances may have access to configuration data that indicates which proxy VMs serve as egresses for which public sending network addresses. When an MTA instance receives an email that is to be sent by the email sending system, it may determine the public sending network address that the email is to be sent from (i.e., the network address that is to be used as the source network address of the email) and consult the configuration data to determine which proxy VM serves as the egress for that public sending network address. The MTA instance may then send the email to the proxy VM that serves as the egress for the public sending network address and this proxy VM may send the email to its destination from the public sending network address.

Figure 9:
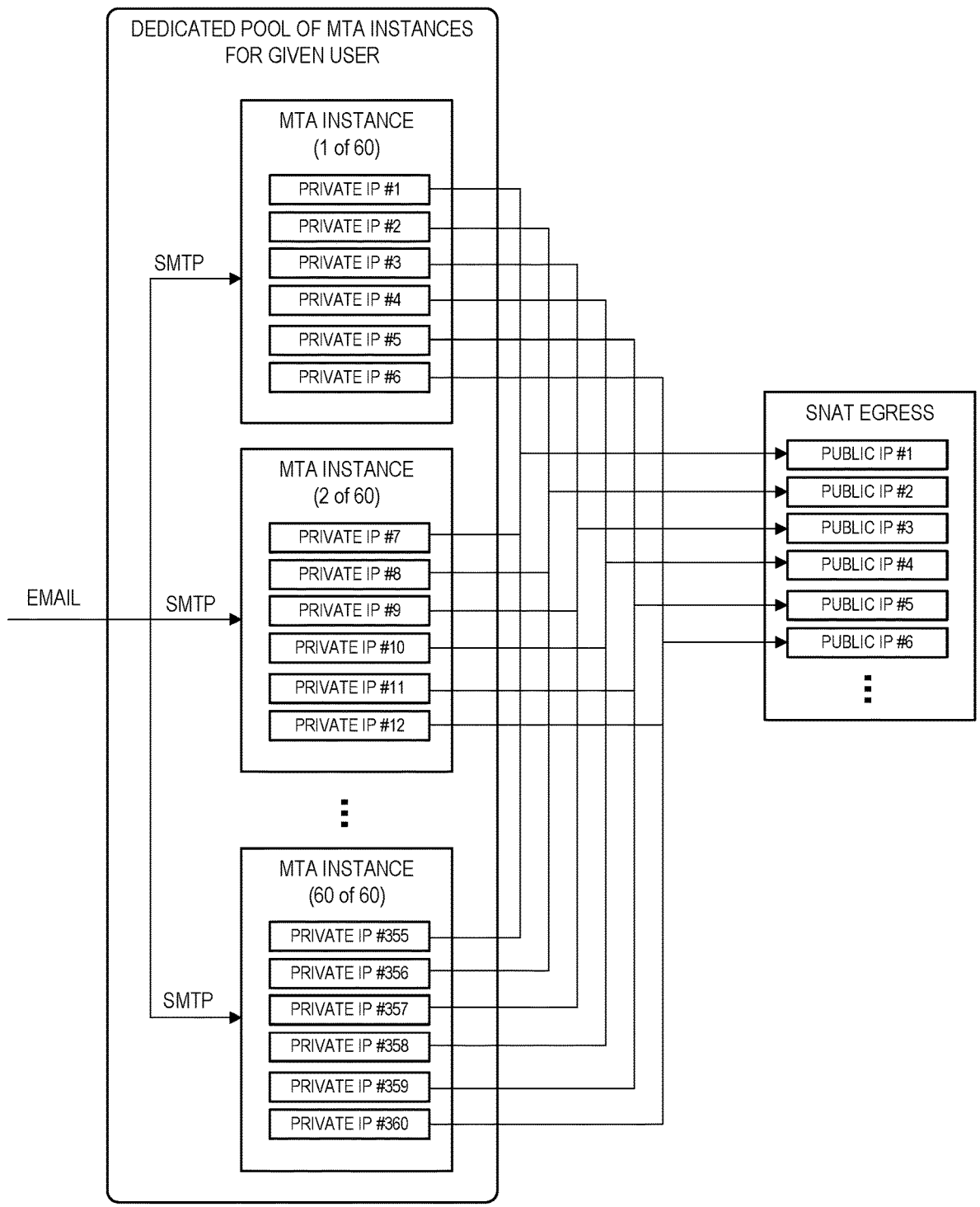
FIG. 9 is a block diagram illustrating a conventional email sending system.

An advantage of the email sending system described herein is that it only needs enough MTA instances to handle the peak concurrent email sending load of the email sending system as a whole (e.g., the peak concurrent email sending load of all users of the email sending system)—this is in contrast to existing email sending systems that have dedicated pools of MTA instances for each user that have to be sized to be able to handle the peak email sending load of each user. As a result, the email sending system described herein may be able to provide the same/similar email sending performance as existing email sending systems but with fewer MTA instances, thereby saving valuable resources (e.g., processing, storage, and networking resources). Also, since users of the email sending system can share a large pool of MTA instances (and users are not limited to just using their own dedicated pool of MTA instances as they are in existing email sending systems), the email sending system described herein may better handle sudden bursts of email sends by a user (e.g., a user can potentially use all of the MTA instances for itself assuming other users are not using the MTA instances at that time). Another advantage of the email sending system described herein is that it needs less private network addresses (e.g., internal Internet Protocol (IP) addresses on private subnets) to support email sends compared to existing email sending systems (e.g., which need M*N private network addresses per user, where M is the number of MTA instances allocated to the user and N is the number of public sending network addresses assigned to the user (e.g., as shown in FIG. 9), and also need to define static networking rules (e.g., that map different private network addresses to public sending network addresses)), which makes it more scalable and reduces networking complexity. Implementations are further described herein with reference to the accompanying figures.

Figure 1:
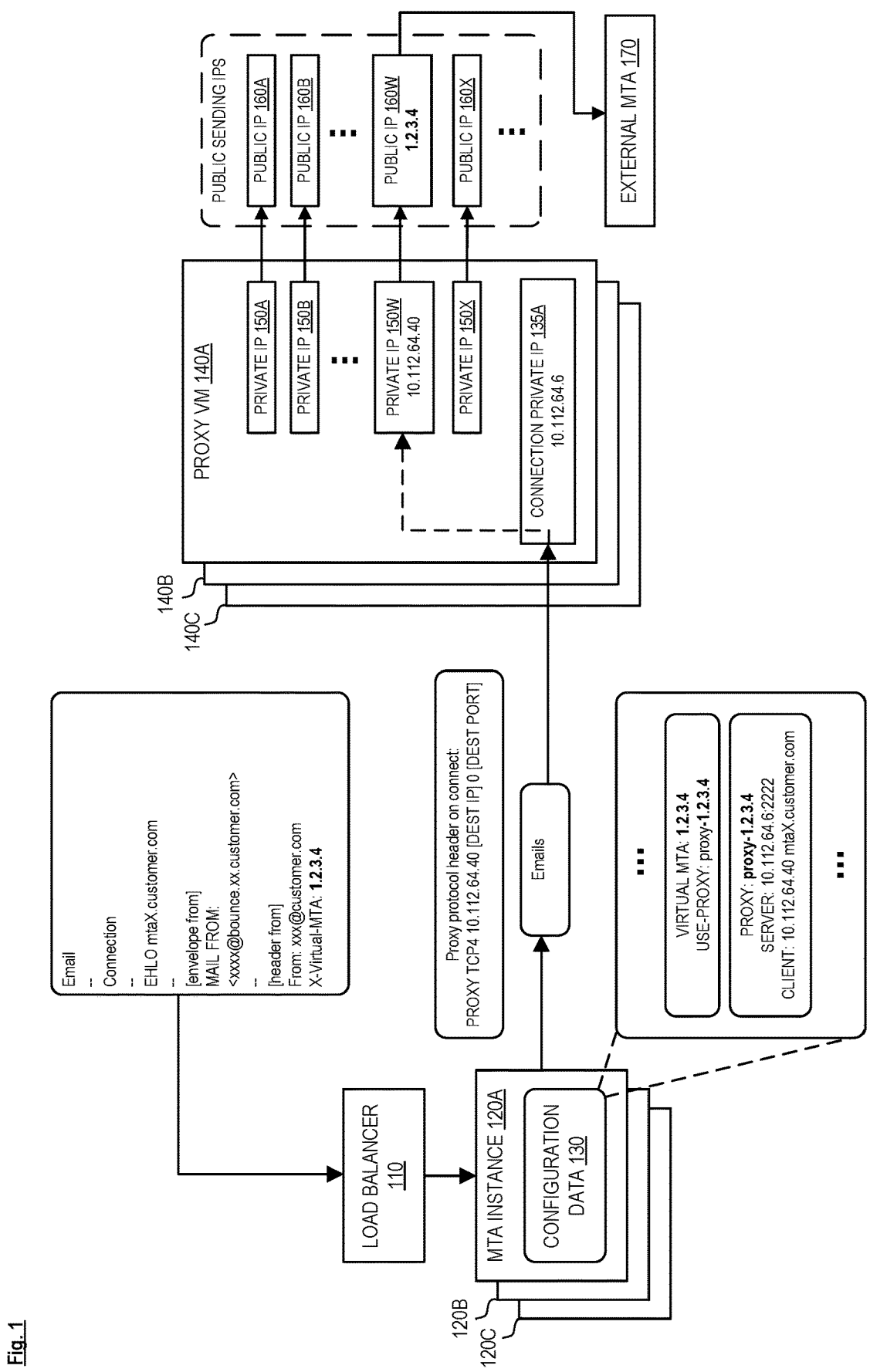
FIG. 1 is a block diagram of an email sending system, according to some implementations.

FIG. 1 is a block diagram of an email sending system, according to some implementations. As shown in the diagram, the email sending system includes a load balancer 110, MTA instances 120A-C, proxy VMs 140A-C, and an external MTA 170. As will be further described herein, the email sending system may provide an email sending service that sends emails on behalf of its users from different public sending network addresses. In one implementation, all or part of the email sending system is implemented in a cloud computing platform (e.g., in Microsoft Azure®). As used herein, a public sending network address is a network address that is routable on a public network (e.g., the internet) and that an email sending system can use as the source network address when sending email. In one implementation, the public sending network address is an Internet Protocol (IP) address (the diagrams show an example where IP address is used as the network address). The email sending system may have a pool of public sending network addresses that it can use to send emails from. The email sending system may partition this pool of public sending network addresses among its users such that emails for a given user are sent from the public sending network addresses assigned to that user.

The load balancer 110 may receive emails that are to be sent by the email sending system and send the emails to the MTA instances 120A-C for processing. The emails that the load balancer 110 receives may include a header that indicates a requested public sending network address for the email (e.g., the public sending network address that is requested to be used as the source network address of the email). In one implementation, the requested public sending network address is indicated in a "X-Virtual-MTA" header of the email. For example, as shown in the diagram, the load balancer 110 receives an email that includes a "X-Virtual-MTA" header indicating that the requested public sending network address for the email is "1.2.3.4". The requested public sending network address may have been specified by the user sending the email or automatically assigned to the email by the email sending system to be one of the public sending network addresses assigned to the user. The load balancer 110 may distribute emails it receives to the MTA instances 120A-C using any suitable load balancing algorithm (e.g., round-robin). In the example shown in the diagram, the load balancer 110 sends the email to MTA instance 120A.

Each of the proxy VMs 140 may serve as an egress for a set of public sending network addresses. For example, in the example shown in the diagram, proxy VM 140A serves as an egress for public sending network addresses 160A-160X (proxy VM 140A can send emails from any of these public sending network addresses). The number of public sending network addresses 160 that each proxy VM 140 serves as an egress for may be configured differently depending on the implementation. For example, the number may depend on the input/output capacity of the proxy VMs 140 and the expected email load per public sending network address. Each proxy VM 140 may have private network addresses 150 that correspond to the public sending network addresses 160 that it serves as an egress for. For example, in the example shown in the diagram, proxy VM 140A has private network addresses 150A-X that correspond to public sending network addresses 160A-X. Each proxy VM 140 may perform dynamic source network address translations from the private network addresses 150 to the corresponding public sending network addresses 160. Each proxy VM 140 may also have a connection private network address 135 that can be used by the MTA instances 120 to connect to the proxy VM 140. For example, in the example shown in the diagram, proxy VM 140A has a connection private network address 135A of "10.112.64.6".

Each of the MTA instances 120 may have access to configuration data 130 that indicates which proxy VMs serve as egresses for which public sending network addresses and also indicates the private network addresses corresponding to the public sending network addresses. For example, in the example shown in the diagram, the configuration data 130 indicates that the proxy VM 140 having connection private network address 135A "10.112.64.6" (which is proxy VM 140A in the example) serves as the egress for public sending network address 160W "1.2.3.4" and that private network address 150W "10.112.64.40" is the private network address corresponding to public sending network address 160W "1.2.3.4" (e.g., the "SERVER" field indicates the connection private network address 135 and the "CLIENT" field indicates the private network address 150).

Each MTA instance 120 may send/transfer email over a network. When an MTA instance 120 receives an email from the load balancer 110, it may determine the public sending network address that the email is to be sent from (e.g., the network address that is to be used as the source network address of the email) and consult the configuration data 130 to determine which proxy VM 140 serves as the egress for that public sending network address and to determine the private network address corresponding to that public sending network address. The MTA instance 120 may then initiate a connection (e.g., Transmission Control Protocol (TCP) connection) with the proxy VM 140 that serves as the egress for that public sending network address and during connection establishment send an indication of the private network address corresponding to the public sending network address that the email is to be sent from to the proxy VM 140. In one implementation, the MTA instance 120 determines the public sending network address that an email is to be sent from based on the requested public sending network address indicated in a header of the email it receives from the load balancer 110 (e.g., based on the "X-Virtual-MTA" header of the email). For example, in the example shown in the diagram, MTA instance 120A determines that the email is to be sent from public sending network address "1.2.3.4" based on the "X-Virtual-MTA" header of the email indicating that this is the requested public sending network address (as will be described further herein below, in some cases, an MTA instance 120 may decide that the email is to be sent from a public sending network address that is different from the requested public sending network address for the email). MTA instance 120A may then consult the configuration data 130 to determine that the proxy VM 140 having connection private network address 135A "10.112.64.6" (which is proxy VM 140A in the example) is the VM proxy 140 that serves as the egress for public sending network address 160W "1.2.3.4" and that the private network address corresponding to public sending network address 160W "1.2.3.4" is "10.112.64.40". MTA instance 120A may then initiate a connection with proxy VM 140A and during connection establishment send an indication to proxy VM 140A that the private network address is "10.11.2.64.40" (which is the private network address corresponding to public sending network address "1.2.3.4"). In one implementation, the private network address 150 is indicated in a proxy protocol header during connection establishment. For example, in the example shown in the diagram, the private network address 150 may be indicated in the source network address field of the proxy protocol header (e.g., "PROXY TCP4 10.112.64.40 [DEST IP] 0 [DEST PORT]"). The proxy protocol header is traditionally used to indicate the client(s) that is behind a proxy but implementations may repurpose the proxy protocol header to indicate a network address corresponding to the public sending network address that an email is to be sent from as well as the destination IP and port to connect to. It should be noted that in addition to indicating the public sending network address that the proxy VM 140 should send an email from (e.g., by indicating the private network address corresponding to the public sending network address), the proxy protocol header may also indicate the destination to which the proxy VM 140 should send the email (e.g., the destination IP address and destination port).

When a proxy VM 140 receives an email from an MTA instance 120 over a connection, it may send the email to its destination from the public sending network address corresponding to the private network address indicated during connection establishment (e.g., by performing source network address translation from the private network address to the public sending network address). For example, in the example shown in the diagram, when proxy VM 140A receives the email from MTA instance 120A, it sends the email to its destination (e.g., external MTA 170) from public sending network address "1.2.3.4" since this is the public sending network address corresponding to private network address "10.112.64.40" (e.g., which was the private network address indicated in the proxy protocol header during connection establishment).

Figure 5:
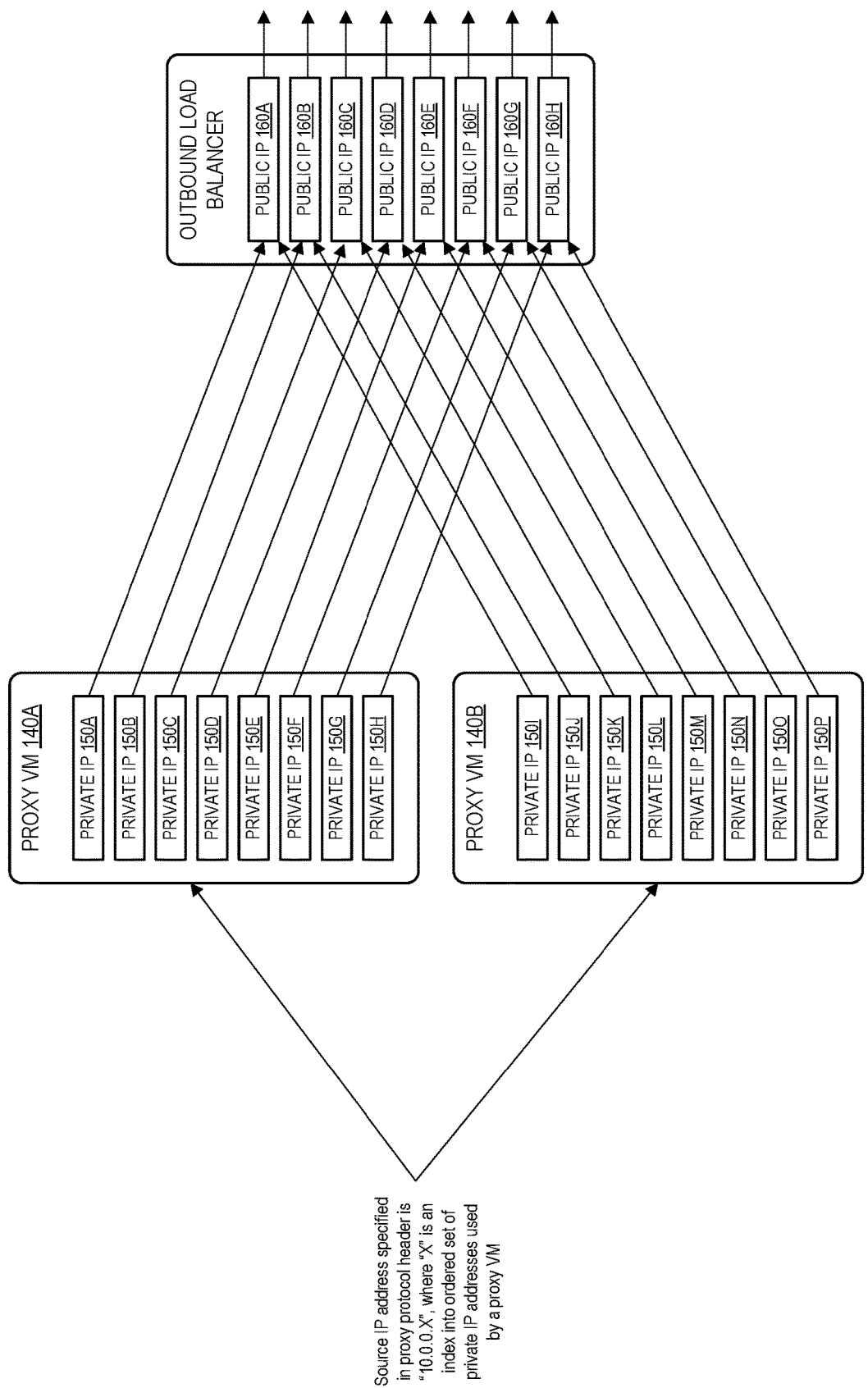
FIG. 5 is a block diagram illustrating multiple proxy VMs serving as egresses for the same public sending network addresses, according to some implementations.

In the example shown in the diagram and described above, a private network address is used to indicate the public sending network address that a proxy VM 140 is to send an email from (e.g., the private network address is specified in the proxy protocol header). Other implementations may use a different value to indicate the public sending network address that a proxy VM 140 is to send an email from as long as the proxy VM 140 has an understanding of how to map that value to the correct public sending network address. For example, other implementations may use the public sending network itself or a special "hint"/identifier/index to indicate the public sending network address that a proxy VM 140 is to send an email from (e.g., a "special" hint via the use of reserved network addresses that indicates which public sending network address to send the email from). Use of the latter approach may allow multiple proxy VMs 140 to serve as egresses for the same public sending network address(es) (and networking mapping upstream of the VM proxies 140 allows multiple reserved network addresses to be associated with a public sending network address). An example of such an implementation is shown in FIG. 5 and described in additional detail herein below.

It should be noted that with the implementations disclosed herein all of the MTA instances 120 may be configured identically (e.g., with the same configuration data 130) and can cause emails to be sent from any of the public sending network addresses by sending the emails to the appropriate proxy VMs 140. This flexibility/ability allows the MTA instances 120 to be shared among users of the email sending system, which confers several advantages.

For example, an advantage of the email sending system described herein is that it only needs enough MTA instances to handle the peak concurrent email sending load of the email sending system as a whole (e.g., the peak concurrent email sending load of all users of the email sending system)—this is in contrast to existing email sending systems that have dedicated pools of MTA instances for each user that have to be sized to be able to handle the peak email sending load of each user. As a result, the email sending system described herein may be able to provide the same/ similar email sending performance as existing email sending systems but with fewer MTA instances, thereby saving valuable resources (e.g., processing, storage, and networking resources). For example, it has been shown that implementations described herein can reduce the number of MTA instances needed by orders of magnitude.

Also, since users of the email sending system can share a large pool of MTA instances (and users are not limited to just using their own dedicated pool of MTA instances as they are in existing email sending systems), the email sending system described herein may better handle sudden bursts of email sends by a user (e.g., a user can potentially use all of the MTA instances for itself assuming other users are not using the MTA instances at that time).

Another advantage of the email sending system described herein is that it needs less private network addresses to support email sends compared to existing email sending systems, which makes it more scalable and reduces networking complexity. For example, implementations may only need a private network address for each MTA instance, a private network address for each proxy VM (the connection private network addresses), and a private network address for each public sending network address. This is in contrast to existing email sending systems that need M*N private network addresses per user, where M is the number of MTA instances allocated to the user and N is the number of public sending network addresses assigned to the user, which scales poorly and adds networking complexity (as it relies on having static networking rules (e.g., that map private network addresses to public sending network addresses)).

It should be understood that the implementations shown in the diagram and described herein are provided by way of example and not intended to be limiting in any way. It should be understood that other implementations can have different configurations. For example, while for the sake of simplicity the email sending system shown in the diagram includes three MTA instances 120 and three proxy VMs 140, other implementations may include different numbers of MTA instances 120 and/or proxy VMs 140 (e.g., the number of MTA instances 120 may be dynamically scaled up/down, as needed, and the number of proxy VMs 140 may be configured depending on input/output capacity of the proxy VMs 140 and expected email load per public sending network address 160). As another example, while the configuration data 130 is shown as having a certain format/structure, it should be understood that other implementations may format/structure the configuration data 130 differently while still conveying the same/similar information.

Figure 2:
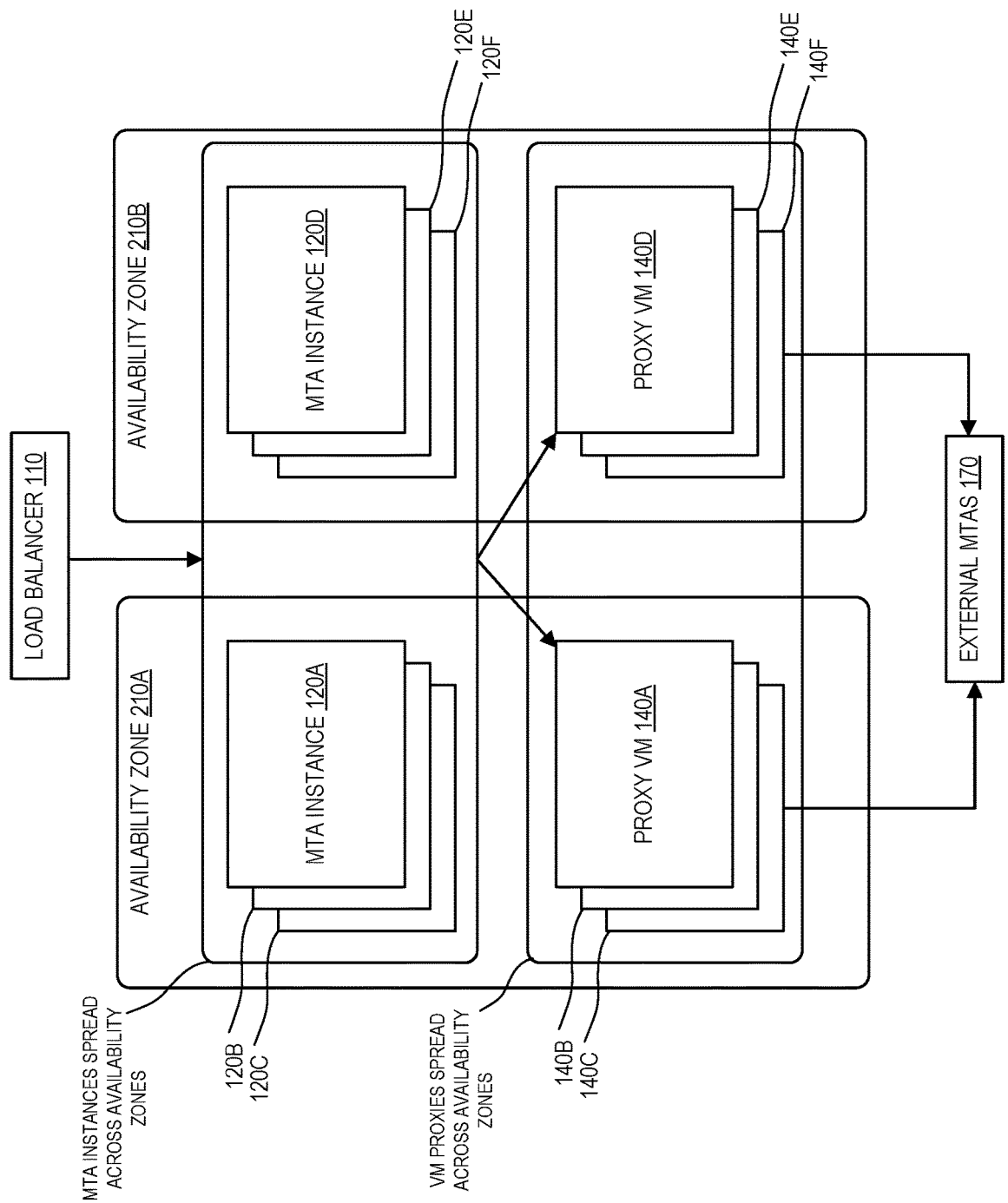
FIG. 2 is a block diagram illustrating MTA instances and proxy VMs being spread across availability zones, according to some implementations.

FIG. 2 is a block diagram illustrating MTA instances and proxy VMs being spread across availability zones, according to some implementations. In one implementation, MTA instances 120 and/or proxy VMs 140 are spread across availability zones 210 to provide fault tolerance. An availability zone 210 may include a set of resources (e.g., computing, storage, and/or networking resources) that are physically or logically separated from the set of resources of other availability zones 210. In the example shown in the diagram, MTA instances 120A-F are spread across availability zones 210A and 210B and proxy VMs 140A-F are also spread across availability zones 210A and 210B. Spreading the MTA instances 120 across availability zones 210 may provide fault tolerance in case any of the availability zones suffers an outage. For example, if availability zone 210A suffers an outage then the load balancer 110 may detect this and stop sending emails to the MTA instances 120A-C in availability zone 210A and instead send emails to the MTA instances 110D-F in availability zone 210B.

Similarly, spreading the proxy VMs 140 across availability zones 210 may provide fault tolerance in case an availability zone suffers an outage. For example, if availability zone 210A suffers an outage then the MTA instances 120 may detect this and stop sending emails to the proxy VMs 140A-C in availability zone 210A and instead send emails to the proxy VMs 140D-F in availability zone 210B. The proxy VMs 140 may then send emails to the external MTAs 170. Additional detail of a failover configuration is further described with reference to FIG. 3 below.

While the diagram shows the MTA instances 120 and the proxy VMs 140 being spread across the same availability zones 210, in other implementations, the MTA instances 120 may be spread across one set of availability zones 210 while the proxy VMs 140 are spread across a different set of availability zones 210. Also, while the diagram shows the MTA instances 120 and the proxy VMs 140 being spread across two availability zones 210, it should be understood that the MTA instances 120 and the proxy VMs 140 may be spread across more than two availability zones 210 to provide further fault tolerance.

Figure 3:
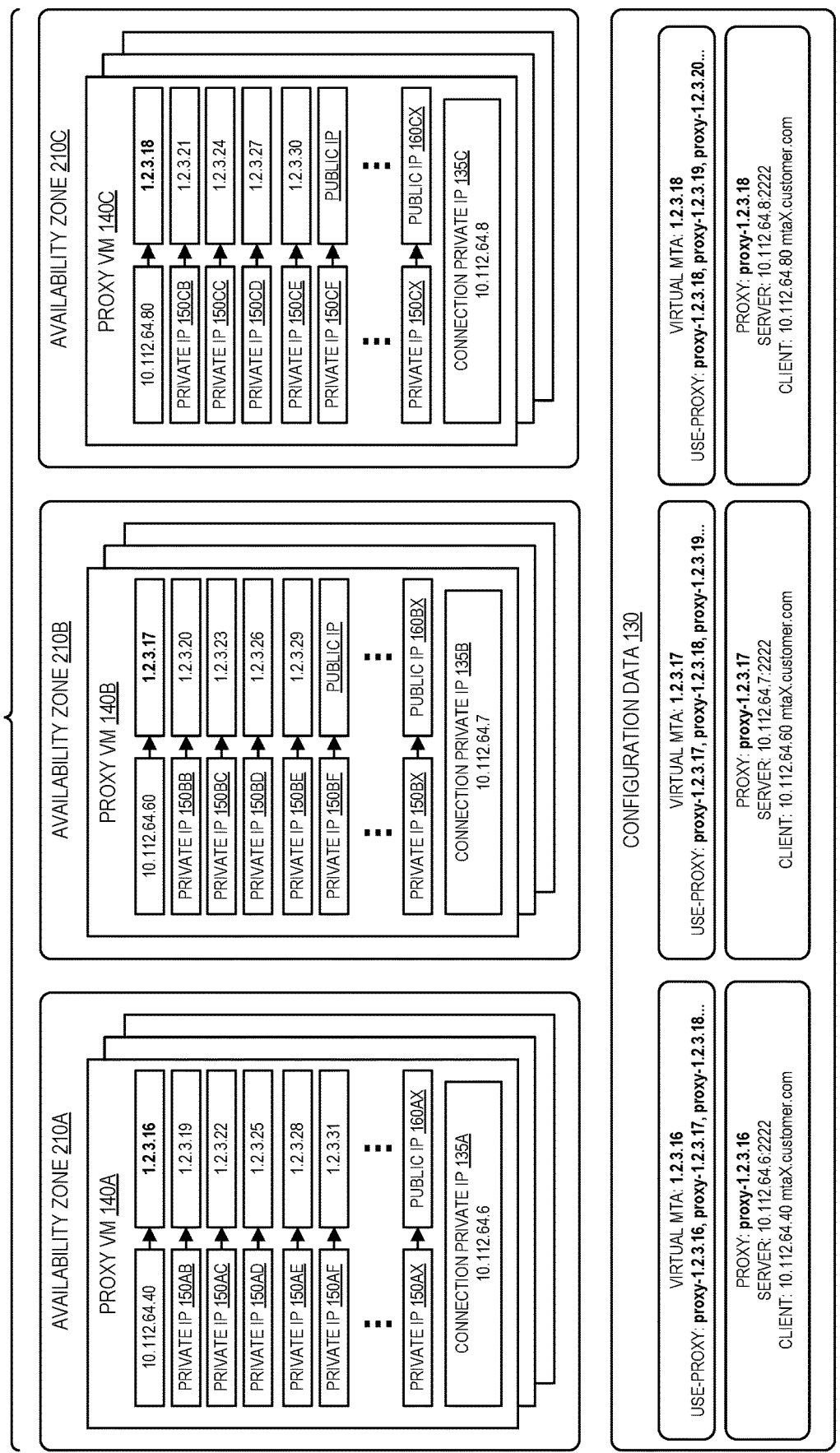
FIG. 3 is a block diagram illustrating a failover mechanism configuration, according to some implementations.

FIG. 3 is a block diagram illustrating a failover mechanism configuration, according to some implementations. As shown in the diagram, proxy VMs 140 are spread across availability zones 210A-C. For example, in the example shown in the diagram, proxy VM 140A is in availability zone 210A, proxy VM 140B is in availability zone 210B, and proxy VM 140C is in availability zone 210C. Each proxy VM 140 has a connection private network address that can be used to connect to the proxy VM 140 and private network addresses 150 corresponding to the public sending network addresses 160 that the proxy VM 140 serves as an egress for. For example, in the example shown in the diagram, proxy VM 140A has connection private network address 135A "10.112.64.6", private network address "10.112.64.40" that corresponds to public sending network address "1.2.3.16", and other private network addresses 150AB-150AF that each correspond to a public sending network address. Similarly, proxy VM 140B has connection private network address 135B "10.112.64.7", private network address "10.112.64.60" that corresponds to public sending network address "1.2.3.17", and other private network addresses 150BB-150BF that each correspond to a public sending network address. Similarly, proxy VM 140C has connection private network address 135C "10.112.64.8", private network address "10.112.64.80" that corresponds to public sending network address "1.2.3.18", and other private network addresses 150BB-150BF that each correspond to a public sending network address.

In one implementation, the configuration data 130 indicates one or more secondary public sending network addresses that can be used to send emails from if a primary public sending network address cannot be used (e.g., because the proxy VM 140 that serves as the egress for the primary public sending network address is not operational or not reachable). The configuration data 130 may be generated such that the proxy VMs 140 that serve as the egresses for the secondary public sending network addresses are in different availability zones 210 from the proxy VM 140 that serves as the egress for the primary public sending network address. For example, in the example shown in the diagram, the configuration data 130 indicates that the secondary public sending network addresses for public sending network address "1.2.3.16" include public sending network addresses "1.2.3.17" and "1.2.3.18" (in the "USE-PROXY"

field). Thus, if the proxy VM 140 that serves as the egress for public sending network address "1.2.3.16" (proxy VM 140A in this example, which is in availability zone 210A) is not operational/reachable then emails may instead be sent to the proxy VM 140 that serves as the egress for public sending network address "1.2.3.17" (proxy VM 140B in this example, which is in availability zone 210B). If the proxy VM 140 that serves as the egress for public sending network address "1.2.3.17" is also not operational/reachable then emails may instead be sent to the proxy VM 140 that serves as the egress for public sending network address "1.2.3.18" (proxy VM 140C in this example, which is in availability zone 210C). The secondary public sending network addresses for the other public sending network addresses may be configured in a similar manner. For example, in the example shown in the diagram, the configuration data 130 indicates that the secondary public sending network addresses for public sending network address "1.2.3.17" include public sending network addresses "1.2.3.18" and "1.2.3.19" and indicates that the secondary public sending network addresses for public sending network address "1.2.3.18" include public sending network addresses "1.2.3.19" and "1.2.3.20".

In one implementation, the public sending network addresses assigned to a given user of the email sending system may be spread across proxy VMs 140 in different availability zones to provide fault tolerance. For example, in the example shown in the diagram, the user's public sending network addresses "1.2.3.16"-"1.2.3.31" are spread across proxy VMs 140A-C that are in different availability zones 210 to provide fault tolerance. While the diagram shows the user's public sending network addresses being spread across three availability zones 210, it should be understood that other implementations may spread public sending network addresses across more or less than three zones (e.g., the user's 16 public sending network addresses may be spread across 16 availability zones).

Figure 4:
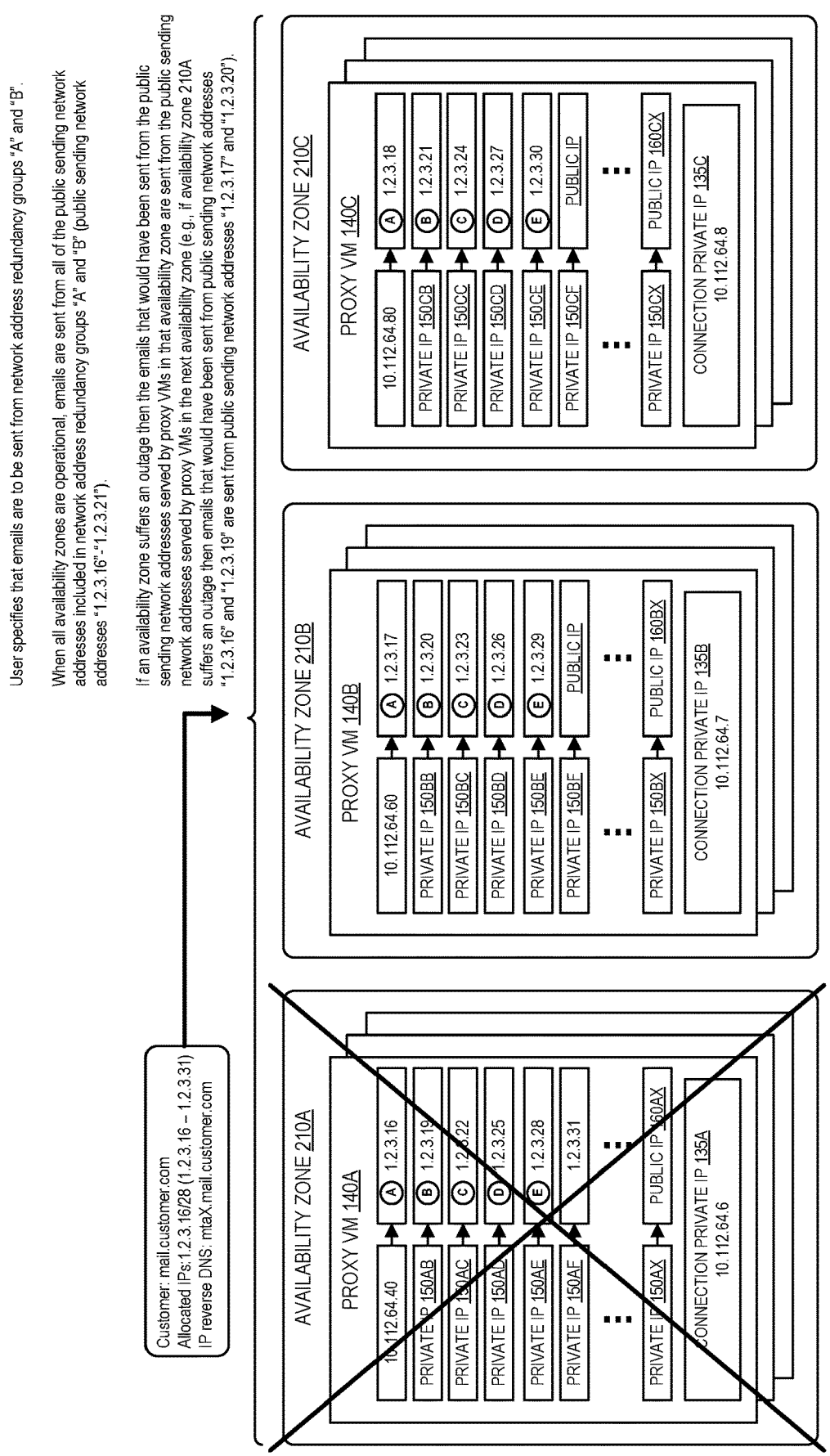
FIG. 4 is a block diagram illustrating network address redundancy groups, according to some implementations.

FIG. 4 is a block diagram illustrating network address redundancy groups, according to some implementations. In one implementation, public sending network addresses assigned to a user are organized into network address redundancy groups and the user may specify which network address redundancy group to send emails from on a per-email basis. The network address redundancy groups may be organized such that a given network address redundancy group includes public sending network addresses spread across multiple proxy VMs 140 in multiple availability zones 210. For example, in the example shown in the diagram, public sending network addresses "1.2.3.16", "1.2.3.17", and "1.2.3.18" are organized into the same network address redundancy group (group "A"), public sending network addresses "1.2.3.19", "1.2.3.20", and "1.2.3.21" are organized into the same network address redundancy group (group "B"), public sending network addresses "1.2.3.22", "1.2.3.23", and "1.2.3.24" are organized into the same network address redundancy group (group "C"), and so on. The email sending system may send emails from one or more network address redundancy groups by selecting one of the public sending network addresses included in those network address redundancy groups and sending emails from the selected public sending network address. For example, if the user specifies that certain emails are to be sent from network address redundancy groups "A" and "B", then the email sending system may send these emails from public sending network addresses "1.2.3.16"-"1.2.3.21" (since those are the public sending network addresses included in network address redundancy groups "A" and "B"). The email sending system may distribute the email sends among the public sending network addresses in any suitable fashion to provide load balancing (e.g., load balance evenly across the public sending network addresses).

In one implementation, if an availability zone 210 suffers an outage, then the email sending system may detect this and stop sending emails from the public sending network addresses that are served by proxy VMs 140 in that availability zone 210. Future emails may be sent from the other public sending network addresses included in the specified network address redundancy group(s) until the availability zone 210 recovers from the outage. For example, continuing with the example mentioned above (where the user specifies that emails are to be sent from network address redundancy groups "A" and "B"), if availability zone 210A suffers an outage (as indicated using the "X" overlaid on top of availability zone 210A in the diagram), then the email sending system may detect this and stop sending emails from public sending network addresses "1.2.3.16" and "1.2.3.19" since these public sending network addresses are served by proxy VMs 140 in availability zone 210A. The email sending system may then start to send emails from the public sending network addresses included in network address redundancy groups "A" and "B" that are served by the proxy VMs 140 in the next availability zone (availability zone 210B), which in this example include public sending network addresses "1.2.3.17" and "1.2.3.20". This may result in an increase in email sends from these public sending network addresses (since emails that would have been sent from public sending network addresses "1.2.3.16" and "1.2.3.19" (via proxy VM 140A in availability zone 210A) are now being sent from public sending network addresses "1.2.3.17" and "1.2.3.20" (via proxy VM 140B in availability zone 210B)). In a similar manner, if availability zone 210B suffers an outage, then the email system may detect this and stop sending emails from the public sending network addresses "1.2.3.17" and "1.2.3.20" and start sending emails from the public sending network addresses that are served by proxy VMs 140 in the next availability zone (availability zone 210C), which in this example include public sending network addresses "1.2.3.18" and "1.2.3.21".

In one implementation, the email sending system includes multiple proxy VMs 140 that can serve as egresses for the same public sending network address and the email sending system may use any of those proxy VMs 140 when sending emails from that public sending network address. For example, as shown in FIG. 5, there can be more than one proxy VM 140 (e.g., proxy VMs 140A and 140B) each having a set of private network addresses that map to the same public sending network addresses (e.g., proxy VM 140A has private network addresses 150A-H that map to public sending network addresses 160A-H, respectively, and proxy VM 140B has private network addresses 150I-P that also map to public sending network addresses 160A-H, respectively). With such a configuration an MTA instance 120 may specify the public sending network address 160 that a proxy VM 140 is to send an email from by specifying a "meta" network address that functions as an index into the private network addresses used by the proxy VM 140. For example, an MTA instance 120 may specify a "meta" network address "10.0.0.X" in the source IP address field of the proxy protocol header sent to the proxy VMs 140, where "X" is an index into the ordered set of private network addresses (e.g., the "meta" network address "10.0.0.0" indexes into the first private IP address of each proxy VM 140, "10.0.0.1" indexes into the second private IP address of each proxy VM 140, and so on). Thus, the MTA instance 120 may specify the "meta' network address (or index) corresponding to the public sending network address in the proxy protocol header to cause an email to be sent from that public sending network address regardless of which of the proxy VMs 140A and 140B is being used. This may be useful in situations where there are multiple redundant proxy VMs 140 that serve as egresses for the same public sending network addresses 160 (e.g., to provide failover and/or to provide higher throughput). In one implementation, the email sending system includes a primary proxy VM 140 and a secondary proxy VM 140 that "shadows" the primary proxy VM 140 (e.g., the secondary proxy VM 140 has the same private network address to public sending network address mappings (for source network address translation) as the primary proxy VM 140). In such an implementation, if the primary proxy VM 140 suffers an outage then the email sending system may detect this and transition to using the secondary proxy VM 140 to send emails.

In one implementation, the email sending system uses both the legacy email sending configuration (where each user is allocated a dedicated pool of MTA instances) and the new email sending configuration described herein (where a single pool of MTA instances is shared among users, as described herein). In this case, a given user of the email sending system may be assigned a first set of public sending network addresses to be used with the legacy email sending configuration and a second set of public sending network addresses to be used with the new email sending configuration. In one implementation, the email sending system may initially send most of the user's emails from the first set of public sending network addresses using the legacy email sending configuration and then over time ramp up the percentage of emails sent from the second set of public sending network addresses using the new email sending configuration to "warm" the second set of public sending network addresses. Once the second set of public sending network addresses are "warmed" the first set of public sending network addresses may be unassigned (and assigned to another user of the email sending system or used for some other purpose).

Figure 6:
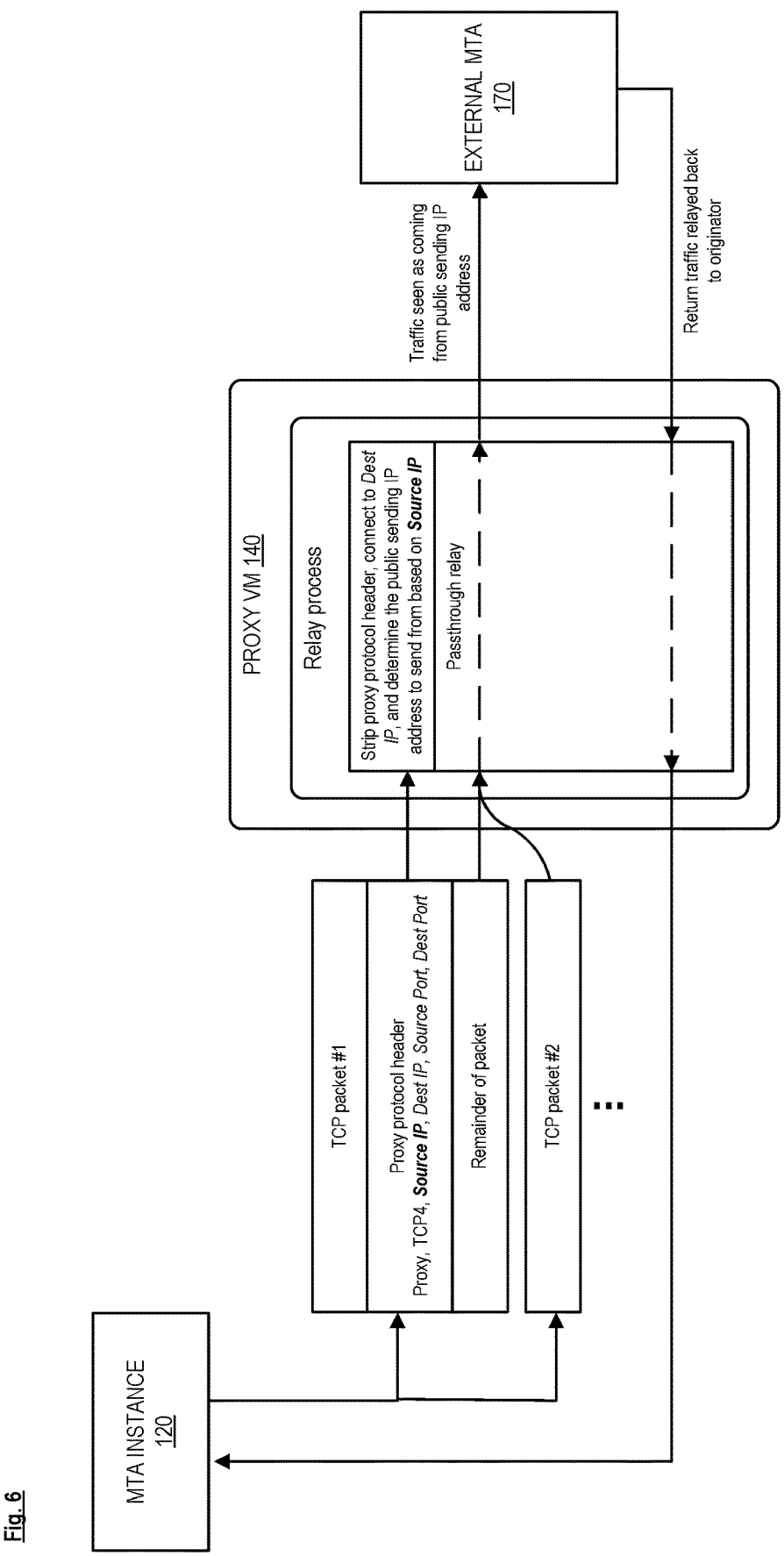
FIG. 6 is a block diagram illustrating traffic flow in an email sending system, according to some implementations.

FIG. 6 is a block diagram illustrating traffic flow in an email sending system, according to some implementations. When an MTA instance 120 establishes a connection (e.g., Transmission Control Protocol (TCP) connection) with a proxy VM 140 it may send a TCP packet (e.g., TCP packet #1 in the diagram) to the proxy VM 140 including a proxy protocol header that indicates the protocol (e.g., "TCP4"), the source network address, the destination network address, the source port, and the destination port. The source network address field of the proxy protocol header may be used/repurposed to indicate to the proxy VM 140 the public sending network address that subsequent emails sent over this connection are to be sent from (e.g., this may be indirectly indicated by indicating the private network address corresponding to the public sending network address). The proxy VM 140 may strip and read this proxy protocol header (and particularly the source network address field of the proxy protocol header) to determine which public sending network address to send emails received over this connection from. The proxy VM 140 may then send subsequent emails/traffic (e.g., the remainder of TCP packet #1 and subsequent packets shown in the diagram) received over this connection to their destination (e.g., the external MTA 170) from the determined public sending network address (acting as a configurable SNAT relay so that TCP traffic is seen as coming from the public sending network address). Any return traffic is relayed back to the originator.

Figure 7:
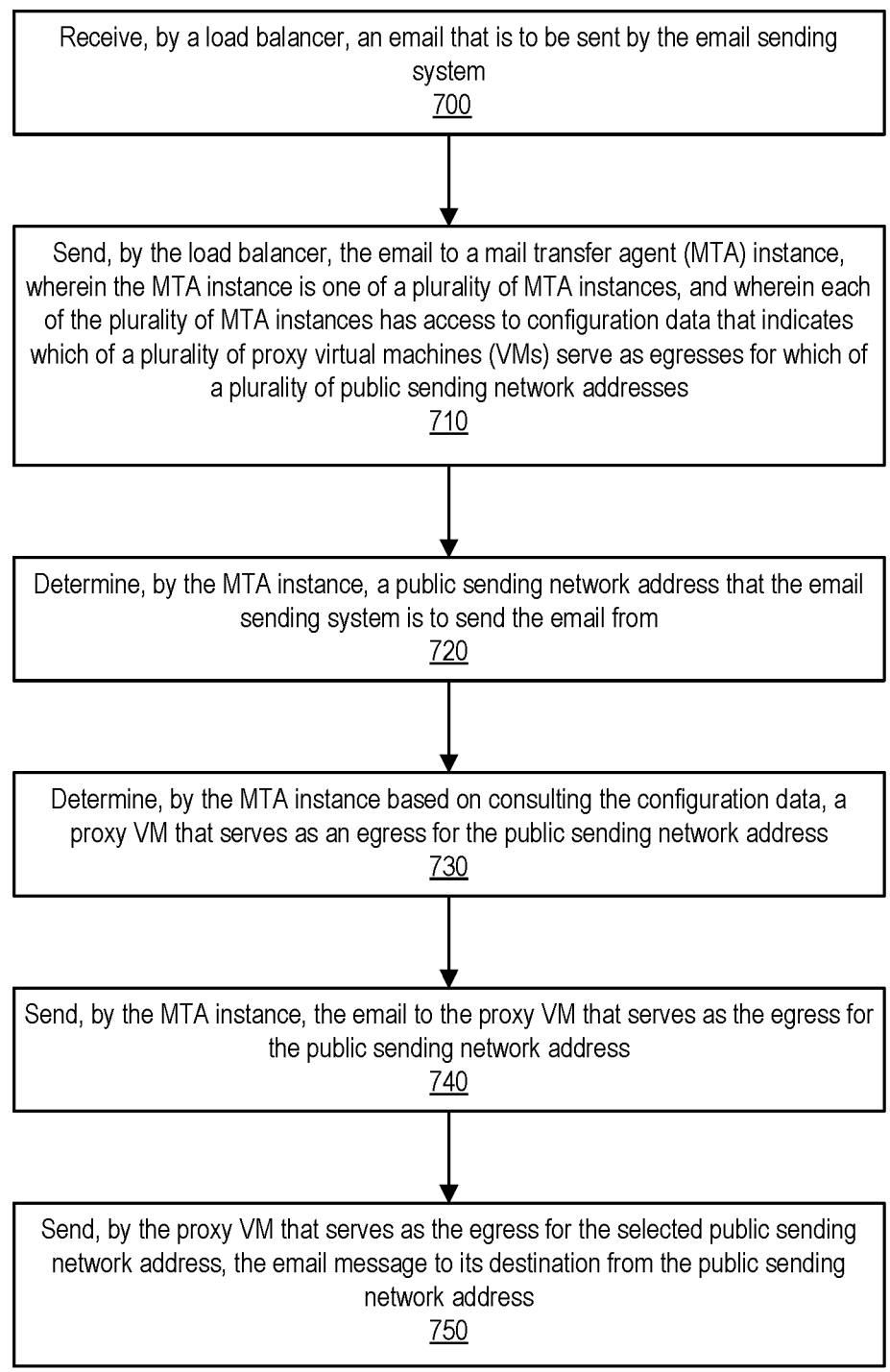
FIG. 7 is a flow diagram of a process for sending emails from different public sending network addresses, according to some implementations.

FIG. 7 is a flow diagram of a process for sending emails from different public sending network addresses, according to some implementations. In one implementation, the process is implemented by one or more networking devices of an email sending system. The process may be implemented using hardware, software, firmware, or any combination thereof. The operations in the flow diagrams are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams. While the flow diagrams show a particular order of operations performed by certain implementations, it should be understood that such order is exemplary (e.g., alternative implementations may perform the operations in a different order, combine certain operations, overlap certain operations, etc.).

At block 700, a load balancer receives an email that is to be sent by the email sending system.

At block 710, the load balancer sends the email to an MTA instance, where the MTA instance is one of a plurality of MTA instances, and where each of the plurality of MTA instances has access to configuration data that indicates which of a plurality of proxy VMs serve as egresses for which of a plurality of public sending network addresses. In one implementation, the plurality of MTA instances is shared among a plurality of users of the email sending system. In one implementation, the MTA instances in the plurality of MTA instances are spread across a plurality of availability zones (e.g., to provide fault tolerance). Additionally or alternatively, in one implementation, the proxy VMs in the plurality of proxy VMs are spread across a plurality of availability zones (e.g., to provide fault tolerance).

At block 720, the MTA instance determines a public sending network address that the email sending system is to send the email from. In one implementation, the email received by the MTA instance includes a header that indicates a requested public sending network addresses for the email. In one implementation, the header is an X-Virtual-MTA header. In one implementation, the configuration data further indicates one or more secondary public sending network addresses that the email sending system is to send emails from if the email sending system is unable to send emails from the requested public sending network address. In one implementation, the MTA instance determines the public sending network address that the email sending system is to send the email from to be the requested public sending network address indicated in the header of the email in response to a determination that the proxy VM that serves as the egress for the requested public sending network address is operational. In one implementation, the MTA instance determines the public sending network address that the email sending system is to send the email from to be one of the one or more secondary public sending network addresses indicated in the configuration data in response to a determination that the proxy VM that serves as the egress for the requested public sending network address is not operational. In one implementation, the email received by the MTA instance includes a header that indicates a network address redundancy group that the email sending system is to send the email from, where the network address redundancy group includes a plurality of public sending network addresses, and where the MTA instance determines the public sending network address that the email sending system is to send the email from to be one of the public sending network addresses included in the network address redundancy group.

At block 730, the MTA instance determines, based on consulting the configuration data, a proxy VM that serves as an egress for the public sending network address. In one implementation, the configuration data further indicates private network addresses corresponding to the plurality of public sending network addresses. In one implementation, the MTA instance determines based on consulting the configuration data, a private network address corresponding to the public sending network address and sends an indication of the private network address corresponding to the public sending network address to the proxy VM that serves as the egress for the public sending network address. The proxy VM that serves as the egress for the public sending network address may then use the private network address corresponding to the public sending network address to send the email to its destination from the public sending network address (e.g., by translating the private network address to the public sending network address as part of source network address translation). In one implementation, the indication of the private network address corresponding to the public sending network address is sent by the MTA instance to the proxy VM that serves as the egress for the public sending network address in a proxy protocol header during connection establishment.

At block 740, the MTA instance sends the email to the proxy VM that serves as the egress for the public sending network address.

At block 750, the proxy VM that serves as the egress for the public sending network address sends the email to its destination from the public sending network address.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions (computer-readable instructions) and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8A:
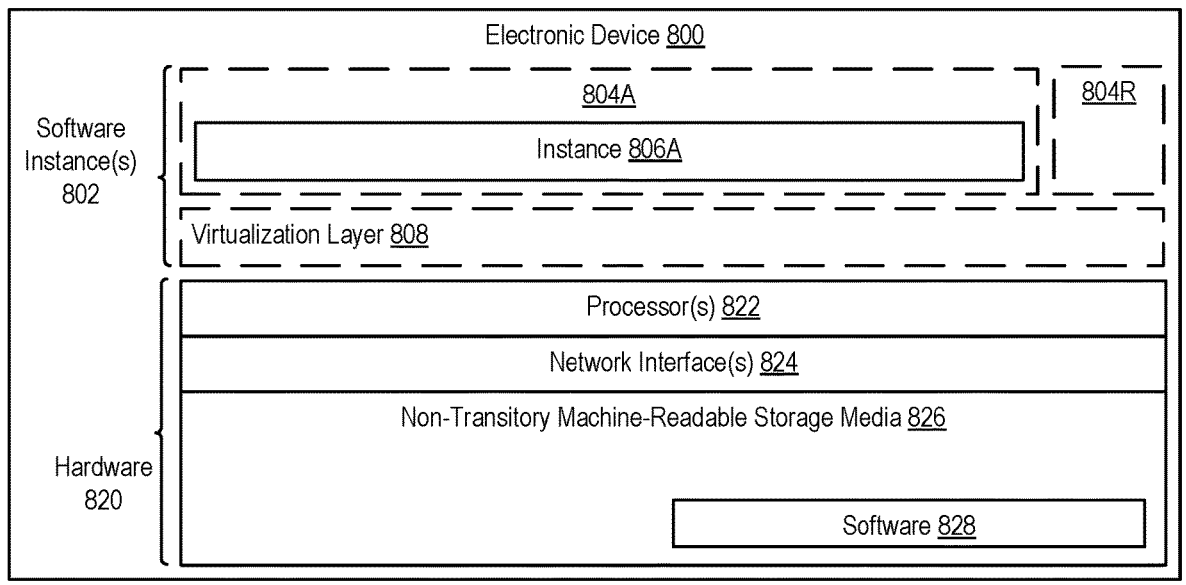
FIG. 8A is a block diagram illustrating an electronic/network device, according to some implementations.

FIG. 8A is a block diagram illustrating an electronic/network device 800, according to some implementations. FIG. 8A includes hardware 820 comprising a set of one or more processor(s) 822, a set of one or more network interfaces 824 (wireless and/or wired), and non-transitory machine-readable storage media 826 having stored therein software 828 (which includes instructions executable by the set of one or more processor(s) 822). The previously described email sending service may be implemented in one or more electronic devices 800. In one implementation: 1) each of the end user clients is implemented in a separate one of the electronic devices 800 (e.g., in user electronic devices operated by users where the software 828 represents the software to implement end user clients to interface with the email sending service (e.g., a web browser, a native client, a portal, a command-line interface, and/or an application program interface (API) based upon protocols such as Simple Object Access Protocol (SOAP), Representational State Transfer (REST), etc.)); 2) the email sending service is implemented in a separate set of one or more of the electronic devices 800 (e.g., a set of one or more server electronic devices where the software 828 represents the software to implement the email sending service); and 3) in operation, the electronic devices implementing the end user clients and the email sending service would be communicatively coupled (e.g., by a network) and would establish between them (or through one or more other layers) connections for submitting requests to the email sending service to send emails. Other configurations of electronic devices may be used in other implementations (e.g., an implementation in which the end user client and the email sending service are implemented on a single electronic device 800).

In electronic devices that use compute virtualization, the set of one or more processor(s) 822 typically execute software to instantiate a virtualization layer 808 and software container(s) 804A-R (e.g., with operating system-level virtualization, the virtualization layer 808 represents the kernel of an operating system (or a shim executing on a base operating system) that allows for the creation of multiple software containers 804A-R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 828 (illustrated as instance 806A) is executed within the software container 804A on the virtualization layer 808. In electronic devices where compute virtualization is not used, the instance 806A on top of a host operating system is executed on the "bare metal" electronic device 800. The instantiation of the instance 806A, as well as the virtualization layer 808 and software containers 804A-R if implemented, are collectively referred to as software instance(s) 802.

Alternative implementations of an electronic device may have numerous variations from that described above. For example, customized hardware and/or accelerators might also be used in an electronic device.

Exemplary Environment

Figure 8B:
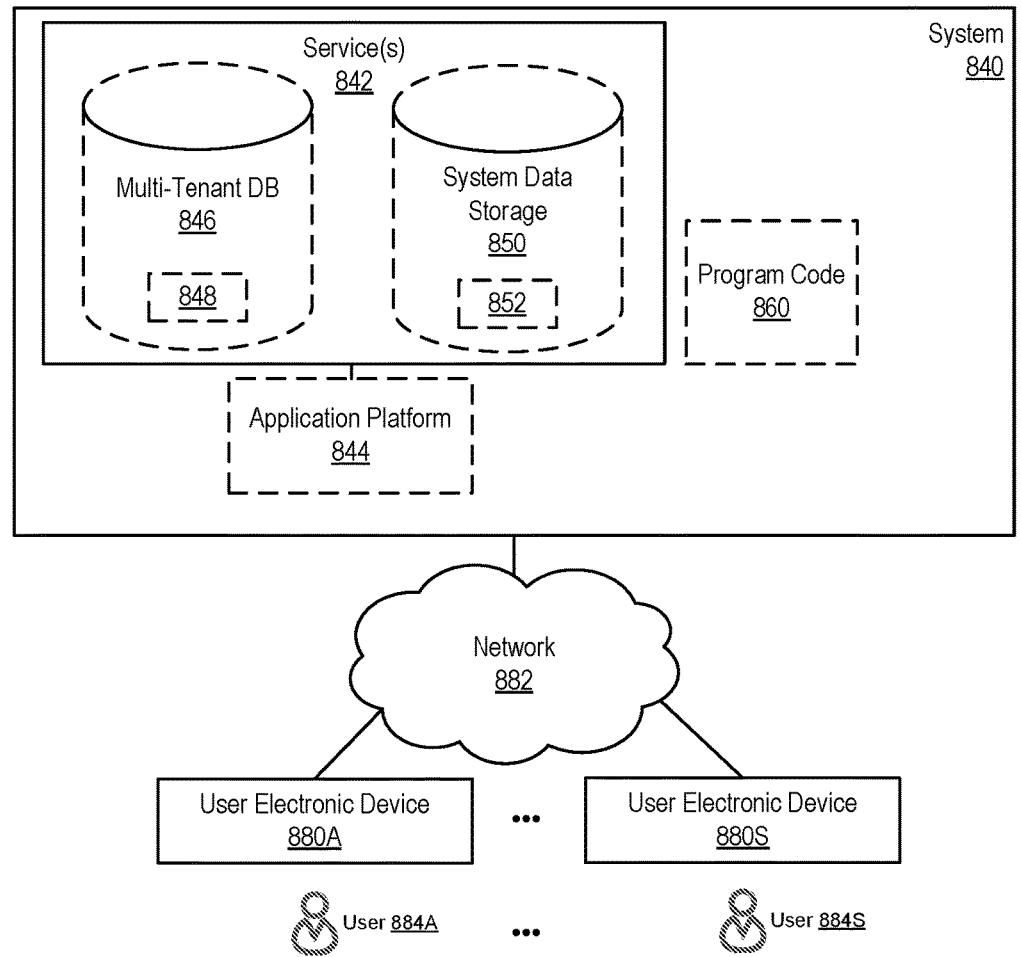
FIG. 8B is a block diagram of an environment where an email sending system may be deployed, according to some implementations.

FIG. 8B is a block diagram of an environment where an email sending system may be deployed, according to some implementations. A system 840 includes hardware (a set of one or more electronic devices) and software to provide service(s) 842, including the email sending service described herein. The system 840 is coupled to user electronic devices 880A-S over a network 882. The service(s) 842 may be on-demand services that are made available to one or more of the users 884A-S working for one or more other organizations (sometimes referred to as outside users) so that those organizations do not need to necessarily be concerned with building and/or maintaining a system, but instead makes use of the service(s) 842 when needed (e.g., on the demand of the users 884A-S). The service(s) 842 may communication with each other and/or with one or more of the user electronic devices 880A-S via one or more Application Programming Interface(s) (APIs) (e.g., a Representational State Transfer (REST) API). The user electronic devices 880A-S are operated by users 884A-S.

In one implementation, the system 840 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), an email sending service 842 (which may be part of the marketing service in some implementations), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 840 may include an application platform 844 that enables PAAS for creating, managing, and executing one or more applications developed by the provider of the application platform 844, users accessing the system 840 via one or more of user electronic devices 880A-S, or third-party application developers accessing the system 840 via one or more of user electronic devices 880A-S.

In some implementations, one or more of the service(s) 842 may utilize one or more multi-tenant databases 846 for tenant data 848, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user electronic device 880A-S communicate with the server(s) of system 840 to request and update tenant-level data and system-level data hosted by system 840, and in response the system 840 (e.g., one or more servers in system 840) automatically may generate one or more Structured Query Language (SQL) statements (e.g., one or more SQL queries) that are designed to access the desired information from the one or more multi-tenant database 846 and/or system data storage 850.

In some implementations, the service(s) 842 are implemented using virtual applications dynamically created at run time responsive to queries from the user electronic devices 880A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, including the email sending service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 840 and the user electronic devices 880A-S.

Each user electronic device 880A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 840. For example, the user interface device can be used to access data and applications hosted by system 840, and to perform searches on stored data, and otherwise allow a user 884 to interact with various GUI pages that may be presented to a user 884. User electronic devices 880A-S might communicate with system 840 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 880A-S might include an HTTP client, commonly referred to as a "browser," for sending and receiving HTTP messages to and from server(s) of system 840, thus allowing users 884 of the user electronic device 880A-S to access, process and view information, pages and applications available to it from system 840 over network 882.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method by one or more network devices implementing an email sending system to send emails from different public sending network addresses, the method comprising:
   receiving, by a load balancer, an email that is to be sent by the email sending system;
   sending, by the load balancer, the email to a mail transfer agent (MTA) instance, wherein the MTA instance is one of a plurality of MTA instances, and wherein each of the plurality of MTA instances has access to configuration data that indicates which of a plurality of proxy virtual machines (VMs) serve as egresses for which of a plurality of public sending network addresses;

determining, by the MTA instance, a public sending network address that the email sending system is to send the email from;

determining, by the MTA instance based on consulting the configuration data, a proxy VM that serves as an egress for the public sending network address;

sending, by the MTA instance, the email to the proxy VM that serves as the egress for the public sending network address; and sending, by the proxy VM that serves as the egress for the public sending network address, the email to its destination from the public sending network address such that the destination sees the public sending network address as being a source network address of the email, wherein the proxy VM also serves as an egress for one or more additional public sending network addresses from which the email sending system can send emails.

2. The method of claim 1, wherein the plurality of MTA instances is shared among a plurality of users of the email sending system.

3. The method of claim 1, wherein the email, when received by the MTA instance, includes a header that indicates a requested public sending network addresses for the email.

4. The method of claim 3, wherein the header is an X-Virtual-MTA header.

5. The method of claim 3, wherein the configuration data further indicates one or more secondary public sending network addresses that the email sending system is to send emails from if the email sending system is unable to send emails from the requested public sending network address.

6. The method of claim 5, wherein the MTA instance determines the public sending network address that the email sending system is to send the email from to be the requested public sending network address indicated in the header of the email in response to a determination that the proxy VM that serves as the egress for the requested public sending network address is operational.

7. The method of claim 5, wherein the MTA instance determines the public sending network address that the email sending system is to send the email from to be one of the one or more secondary public sending network addresses indicated in the configuration data in response to a determination that the proxy VM that serves as the egress for the requested public sending network address is not operational.

8. The method of claim 1, wherein the configuration data further indicates private network addresses corresponding to the plurality of public sending network addresses.

9. The method of claim 8, further comprising:

determining, by the MTA instance based on consulting the configuration data, a private network address corresponding to the public sending network address; and sending, by the MTA instance to the proxy VM that serves as the egress for the public sending network address, an indication of the private network address corresponding to the public sending network address, wherein the proxy VM that serves as the egress for the public sending network address uses the private network address corresponding to the public sending network address to send the email to its destination from the public sending network address.

10. The method of claim 9, wherein the indication of the private network address corresponding to the public sending network address is sent by the MTA instance to the proxy VM that serves as the egress for the public sending network address in a proxy protocol header during connection establishment.

11. The method of claim 1, wherein the MTA instances in the plurality of MTA instances are spread across a plurality of availability zones.

12. The method of claim 1, wherein the proxy VMs in the plurality of proxy VMs are spread across a plurality of availability zones.

13. The method of claim 1, wherein the email, when received by the MTA instance, includes a header that indicates a network address redundancy group that the email sending system is to send the email from, wherein the network address redundancy group includes a plurality of public sending network addresses, and wherein the MTA instance determines the public sending network address that the email sending system is to send the email from to be one of the public sending network addresses included in the network address redundancy group.

14. A non-transitory machine-readable storage medium that provides instructions that, if executed by one or more processors of one or more network devices implementing an email sending system, will cause the email sending system to perform operations for sending emails from different public sending network addresses, the operations comprising:

receiving, by a load balancer, an email that is to be sent by the email sending system;

sending, by the load balancer, the email to a mail transfer agent (MTA) instance, wherein the MTA instance is one of a plurality of MTA instances, and wherein each of the plurality of MTA instances has access to configuration data that indicates which of a plurality of proxy virtual machines (VMs) serve as egresses for which of a plurality of public sending network addresses;

determining, by the MTA instance, a public sending network address that the email sending system is to send the email from;

determining, by the MTA instance based on consulting the configuration data, a proxy VM that serves as an egress for the public sending network address;

sending, by the MTA instance, the email to the proxy VM that serves as the egress for the public sending network address; and sending, by the proxy VM that serves as the egress for the public sending network address, the email to its destination from the public sending network address such that the destination sees the public sending network address as being a source network address of the email, wherein the proxy VM also serves as an egress for one or more additional public sending network addresses from which the email sending system can send emails.

15. The non-transitory machine-readable storage medium of claim 14, wherein the plurality of MTA instances is shared among a plurality of users of the email sending system.

16. The non-transitory machine-readable storage medium of claim 14, wherein the email, when received by the MTA instance, includes a header that indicates a requested public sending network addresses for the email.

17. The non-transitory machine-readable storage medium of claim 16, wherein the configuration data further indicates one or more secondary public sending network addresses that the email sending system is to send emails from if the email sending system is unable to send emails from the requested public sending network address.

18. One or more network devices configured to implement an email sending system that sends emails from different public sending network addresses, the one or more network devices comprising:
- one or more processors; and
- non-transitory machine-readable storage media having computer-readable instructions stored therein, which when executed by the one or more processors, causes the email sending system to:
  - receive, by a load balancer, an email that is to be sent by the email sending system;
  - send, by the load balancer, the email to a mail transfer agent (MTA) instance, wherein the MTA instance is one of a plurality of MTA instances, and wherein each of the plurality of MTA instances has access to configuration data that indicates which of a plurality of proxy virtual machines (VMs) serve as egresses for which of a plurality of public sending network addresses;
  - determine, by the MTA instance, a public sending network address that the email sending system is to send the email from;
  - determine, by the MTA instance based on consulting the configuration data, a proxy VM that serves as an egress for the public sending network address;
  - send, by the MTA instance, the email to the proxy VM that serves as the egress for the public sending network address; and
  - send, by the proxy VM that serves as the egress for the public sending network address, the email to its destination from the public sending network address such that the destination sees the public sending network address as being a source network address of the email, wherein the proxy VM also serves as an egress for one or more additional public sending network addresses from which the email sending system can send emails.

19. The one or more network devices of claim 18, wherein the plurality of MTA instances is shared among a plurality of users of the email sending system.

20. The one or more network devices of claim 18, wherein the proxy VMs in the plurality of proxy VMs are spread across a plurality of availability zones.

* * * * *